United States Patent Office 3,205,113
Patented Sept. 7, 1965

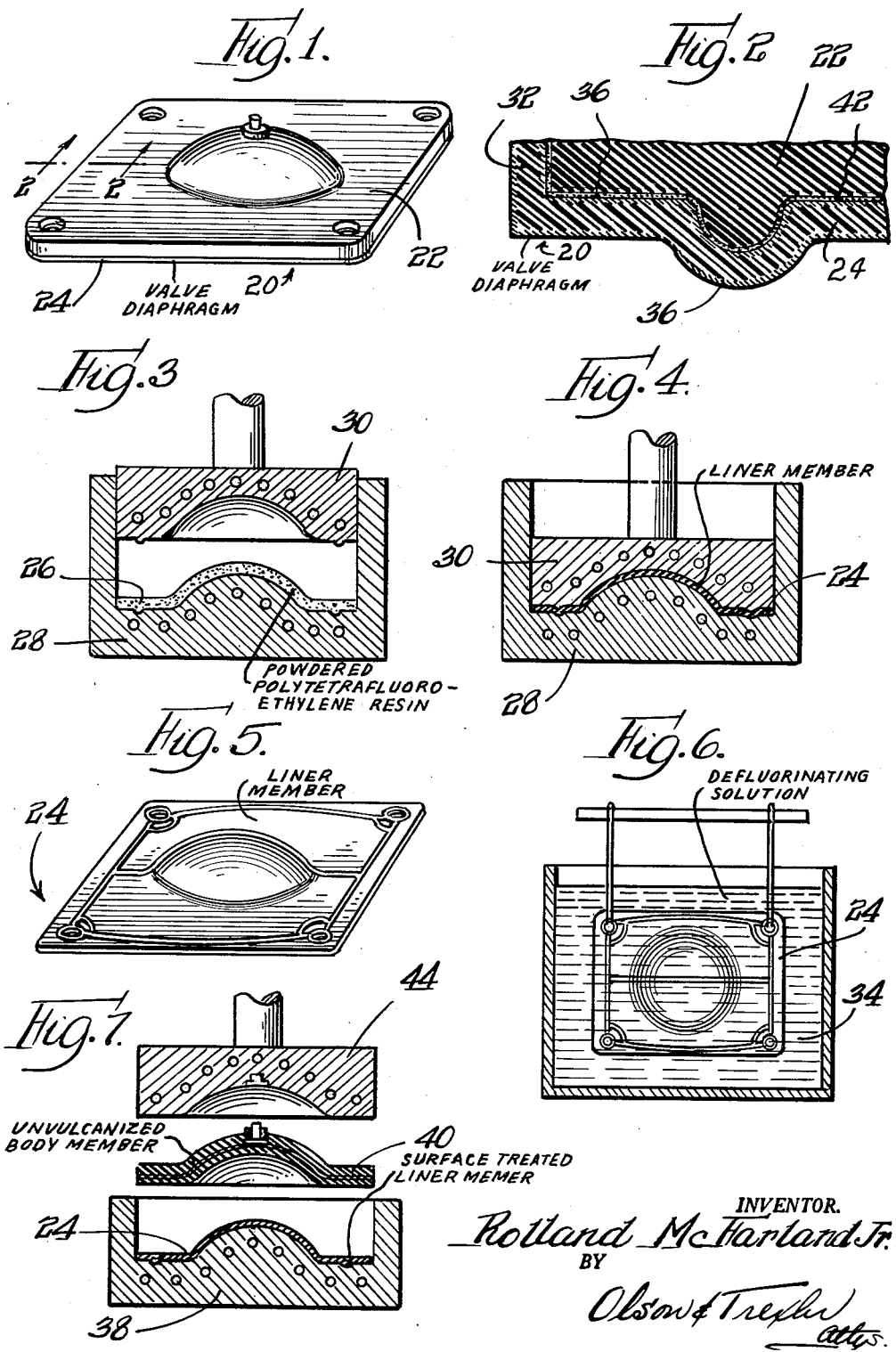

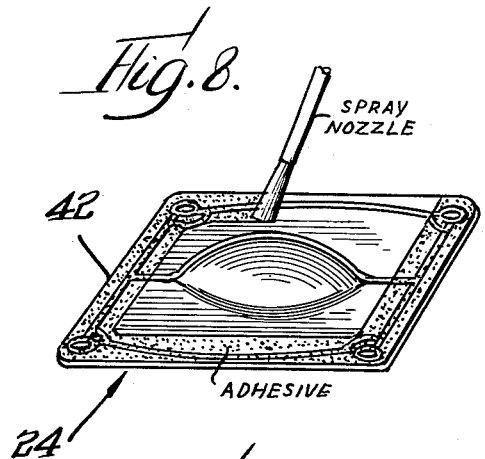
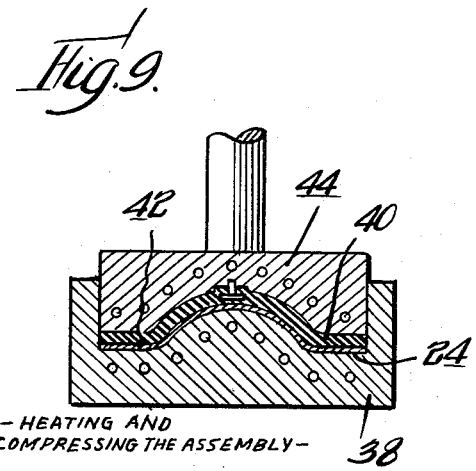
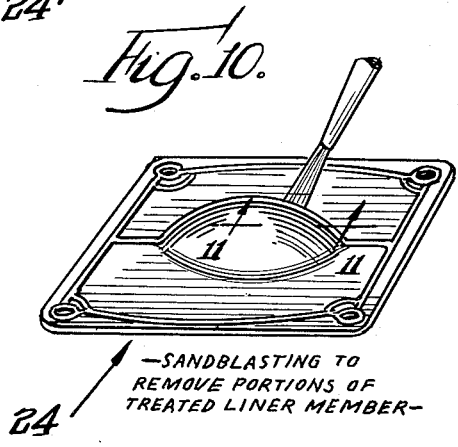
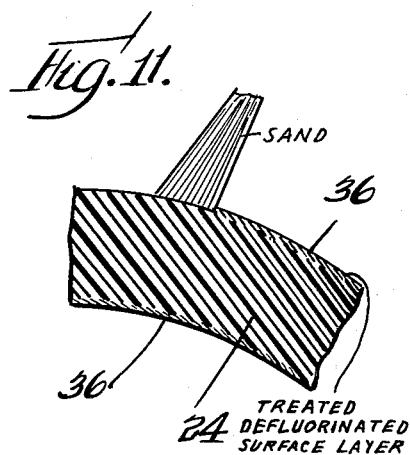
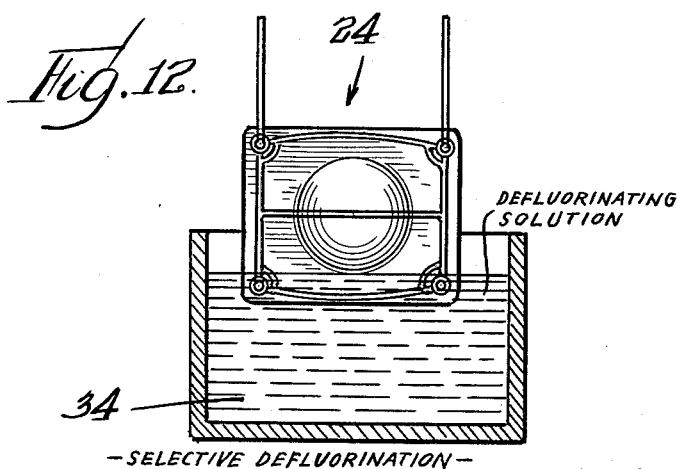

3,205,113
METHOD OF MAKING A VALVE DIAPHRAGM
Rolland McFarland, Jr., Crystal Lake, Ill., assignor to Hills-McCanna Company, Carpentersville, Ill., a corporation of Illinois
Continuation of abandoned application Ser. No. 23,600, May 9, 1960. This application Sept. 18, 1962, Ser. No. 225,407
7 Claims. (Cl. 156—293)

This invention relates generally to a flexible diaphragm and especially to a diaphragm that is adapted for flexing in a valve assembly between an open position and a closed position tightly compressed against a valve seat.

This application is a continuation of my co-pending application, Serial No. 23,600 filed May 9, 1960, now abandoned and entitled "Method of Making a Valve Diaphragm," said co-pending application being a continuation-in-part of my application, Serial No. 563,554 filed February 6, 1956, and now matured as U.S. Patent No. 2,947,325.

Valve structures incorporating elastomeric diaphragm bodies are well known; and when such a valve structure is to be installed in a system handling corrosive fluids, it is desirable to protect the diaphragm body with a liner member formed from a material which is both physically and chemically resistant to the corrosive fluid. Because of the high degree of chemical inertness possessed by polytetrafluoroethylene, this material is especially desirable for fabricating valve liner members. However, polytetrafluoroethylene, because of its chemical inertness, has proved difficult to secure to the body of the elastomeric diaphragm. Accordingly, polytetrafluoroethylene liner members have been heretofore generally provided as elements separate from the diaphragm body thereby complicating handling, shipping and assembly operations.

Hence, an important object of the present invention is to provide a novel method for making a valve diaphragm having a polytetrafluoroethylene liner member intimately secured to an elastomeric body member.

Another object of the invention is to provide a method of securing a polytetrafluoroethylene liner member to an elastomeric body member in such a manner as to preclude rupturing or tearing of the liner member.

Yet another object of the invention is to provide a novel method of making a diaphragm in which the degree of adhesion achieved between the interfacial regions of a polytetrafluoroethylene liner member and an elastomeric body member is selected to preclude rupturing or tearing of the liner member.

Additional objects and features of the invention pertain to the particular materials and procedures whereby the above objects are attained.

The invention will be better understood by reference to the following disclosure and drawings forming a part thereof, wherein:

FIG. 1 is a perspective view of a flexible valve diaphragm constructed in accordance with the procedures of the invention;

FIG. 2 is an enlarged, fragmentary view taken through the section 2—2 of FIG. 1;

FIGS. 3 and 4 are views illustrating successive steps in making the polytetrafluoroethylene liner member;

FIG. 5 is a perspective view of the fabricated liner member;

FIG. 6 is a view illustrating the step of treating the liner member to activate its surface chemically;

FIG. 7 is a view showing assembly of the liner member and an unvulcanized rubber body member;

FIG. 8 is a perspective view showing a method of applying adhesive material to selected portions of the liner member;

FIG. 9 is a view showing the step of molding and curing the valve diaphragm;

FIG. 10 is a perspective view showing one method of processing a liner member prior to adhesively securing it to a body member;

FIG. 11 is an enlarged, fragmentary view taken through the section 11—11 of FIG. 10; and FIG. 12 is a view similar to FIG. 6 but showing an alternative method of treating the liner member so as to activate only selected portions of its surface.

Referring now in detail to the drawings, specifically to FIG. 1, a valve diaphragm indicated generally by the numeral 20 will be seen to include an elastomeric body member 22. The working surface of body member 22, i.e. the surface to be exposed to the corrosive fluids in use, is covered with a polytetrafluoroethylene liner member 24; and in compliance with a feature of the invention, the liner member 24 is selectively bonded to the body member 22.

According to the procedures of the invention, a liner member may be fabricated from polytetrafluoroethylene resin as is shown in FIGS. 3 and 4. There, a layer 26 of powdered polytetrafluoroethylene resin will be seen distributed over the appropriately contoured bottom surface of a mold 28. The layer 26 is preferably built up to a thickness aproximately four times the desired final thickness of the liner member. This procedure is illustrated in FIG. 3.

After the powdered resin 26 has been distributed over the bottom surface of mold 28, a plunger die 30 is urged into the mold 28 to compress and coin the resin. Thereafter, heat is applied to the mold 28 and to the plunger die 30, as by means of electrical or other suitable means, in order to sinter or fuse the powdered resin 26 into a unitary liner member 24. This procedure is illustrated in FIG. 4.

While it is advantageous to mold a liner member 24 in accordance with the procedure described immediately hereinabove, the invention is also intended to embrace forming an already sintered polytetrafluoroethylene film or skived sheet into a liner member. When the liner member has been formed, the surface portions thereof are intended to be activated chemically; however, it is to be realized that formation of the liner member can take place after a polytetrafluoroethylene film or sheet has had its surfaces chemically activated. Furthermore, liner member 24 may be arranged to include side surfaces 32, as is shown in FIG. 2.

After the liner member 24 has been molded, in accordance with one embodiment of the invention, it is subjected to a defluorinating material such as the solution 34 illustrated in FIGS. 6 and 12. Solution 34 comprises metallic sodium dissolved in liquid ammonia and is known to react with polytetrafluoroethylene. A surface 36 displaying unsaturated, carbon-bond linkages results. This unsaturated or chemically activated surface 36 is indicated in FIG. 2.

In accordance with the procedures of the invention, the chemically active surface 36 is utilized in bonding the liner member 24 to the body member 22. Use is made of an adhesive which is susceptible to the formation of interfacial compounds with the activated polytetrafluoroethylene surface. The adhesive-accepting properties of the activated polytetrafluoroethylene surface have been found to be reasonably uniform; and considerable latitude in the degree of activation of the polytetrafluoroethylene surface is enjoyed without materially affecting its adhesive-accepting capabilities.

The interior portions of the liner member are unaffected by the defluorinating process so that the liner member remains effective for protecting the body member of the diaphragm in its ultimate applications.

The formed and now surface-activated liner member 24 is placed in a mold 38 as is shown in FIG. 7. Next, a body member, preferably a suitably arranged, unvulcanized preform 40 of body member, is positioned with respect to the liner member 24. The preform 40 is ordinarily built up from layers of an unvulcanized elastomeric composition and fabric sheets; and suitable elastomeric compositions include those having tensile strengths of approximately 1600 to approximately 1900 p.s.i. and having an elongation of approximately 250%. Suitable elastomeric materials, in addition, desirably display a Shore "A" durometer value of from 60–70 when in the vulcanized state.

A typical compound for use as the elastomeric material of preform 40 is as follows:

| | Parts |
|---|---|
| Butadiene-styrene polymer (elastomer) | 100 |
| Carbon black (reinforcing pigment HAF) | 40 |
| Benzothiazyl disulphide (vulcanizing agent and accelerator) | 2 |
| Sulphur (vulcanizing agent) | 5 |
| Light process oil (plasticizer) | 2 |
| Paraffin wax | 0.5 |
| Phenyl-beta-naphthyl amine (antioxidant) | 1 |

The above material is curable at 320° F. in ten minutes; and the curing cycles for other elastomeric compositions which have been successfully employed in the present invention range from 305–325° F. for from 5–20 minutes.

Because heat is desirably utilized in curing the adhesive material used in bonding the liner member to the body member, elastomeric materials to be used for the preform 40 are advantageously selected to possess a curing cycle which is adequate to cure the adhesive material as well. The particular adhesive contemplated by the present invention and their manner of use will now be described in greater detail.

Before the preform 40 is brought into contact with the liner member 24 in mold 38, a thin layer or coating of an adhesive material 42 is applied to the inner face of either the body preform 40 or the liner member 24, or to both faces if desired. Since it is preferred to permit a certain amount of relative movement between specific interfacial regions of the liner member 24 and the body member 22, particularly in areas placed under stress in use, adhesive material 42, in accordance with one embodiment of the invention, is applied only to peripheral portions of the inner face of liner member 24, as is shown in FIG. 8. There, adhesive material 42 will be seen being sprayed onto the peripheral portions only of the inner face of liner member 24.

Providing a bond between only peripheral portions of the liner member and the body member may also be realized by removing portions of the chemically activated surface 36 from areas which are highly stressed in use. In FIGS. 10 and 11, removal of portions of the chemically activated surface 36 is shown being achieved by sandblasting. Referring to FIG. 12, the provision of a chemically active surface at only the peripheral or unstressed areas of the liner member 24 will be seen achieved by activating only those surface portions, rather than by activating the entire surface of the liner member and removing selected portions thereafter, FIG. 12 illustrating exposure of one edge region of the liner member 24 to the solution 34. It should be realized that such an exposure will be repeated for the remaining three edge regions.

In compliance with a modified embodiment of the invention, the liner member 24 is secured uniformly to the body member 22 with a low degree of adhesion. When stress is applied to such a diaphragm in use, the bond will yield at stressed areas allowing movement between the liner member and the body member thereby precluding undue stress of the liner member and possible rupture. A uniformly low degree of adhesion can be achieved by proper selection of the adhesive material itself and by proper formulation of a given adhesive material. Polyisobutylene has been usefully employed as a material supplying inherently low bond strength, on the order of a few ounces per inch width peel strength.

Control over the strength of the bond between the liner member and the body member can also be obtained by properly formulating a given adhesive material. Table I below illustrates how one adhesive material, Typly-S, sold by the Marbon Chemical Division of Borg-Warner Corp., Chicago, Illinois, has been reformulated to provide different degrees of adhesion. The basis of the several formulations was a 30 milliliter sample of the commercial product, a xylene solution containing 35% adhesive material. Adhesive strength was determined as peel strength on one inch wide strips of skived sheet process polytetrafluoroethylene bonded to a chloroprene base.

Table I

| Formulation | Added solvent (methyl ethyl ketone), ml. | Added filler (carbon black), gms. | Adhesive strength (lbs./inch width) | |
|---|---|---|---|---|
| | | | Avg. | Range |
| B | 6 | 0.5 | 16.7 | 17.6 –15.5 |
| C | 7.5 | 1.0 | 14.3 | 15.0 –13.5 |
| D | 10 | 1.5 | 11.6 | 13.2 –10.0 |
| E | 15 | 2.0 | 13.2 | 14.6 –11.8 |
| F | 30 | 3.0 | 1.26 | 1.55– 0.98 |
| G | 60 | 3.5 | 1.08 | 1.53– 0.63 |
| H | 90 | 4.0 | 1.26 | 1.58– 0.95 |
| I | 120 | 4.5 | 0.67 | 0.92– 0.43 |

A number of other adhesives or cements have been used for attaching and chemically bonding the activated polytetrafluoroethylene liner member to the elastomeric body member. One specific embodiment of the invention employs an adhesive material comprising approximately equal proportions of a polysulphide rubber and a rubber hydrochloride polymer dissolved in xylene to present a 25% solids mixture. In another embodiment, a modified resorcinol-formaldehyde resin was formulated with equal parts of an acrylonitrile copolymer, the resin and copolymer being dissolved in methyl ethyl ketone to give a brushing or spraying consistency material of approximately 30% solids. In further embodiments of the invention, chloro-isoprene polymer latices and isocyanate resins have been dissolved in suitable solvent systems to give useful adhesive materials.

After it has been applied to the activated surface of the liner member 24 in a thin layer approximately 3–5 mils thick, the adhesive material 42 is allowed to air dry. The tacky surface is then contacted with the preform 40. Subsequently, the resultant assembly is positioned in the mold 38 as shown in FIG. 9; and a plunger die 44 is urged into the mold 38 to apply pressure to the assembly. Thereafter, heat is applied by steam or other suitable means for the time and for the period necessary to vulcanize the preform and cure the adhesive material. As the diaphragm is subjected to this heat and pressure, interfacial compounds form between the adhesive material and the chemically activated, polytetrafluoroethylene surface. Moreover, amalgamation occurs between the adhesive material and the uncured elastomeric stock of the preform 40. Under the specified conditions of pressure and temperautre, these reactions are carried to completion; and the liner member 24 is bonded to the body member 22.

The manner in which the present invention may be practiced and the purpose to which it may be put are evident from the foregoing descriptions; and while particular embodiments of the invention have been shown and described, it should be understood, of course, that the in- The invention is claimed as follows:

1. A method of making a diaphragm structure comprising forming a liner member of polytetrafluoroethylene, subjecting only peripheral portions of an inner face of said liner member to a solution of liquid ammonia and sodium and thereby chemically activating only said peripheral portions of the inner face, and then adhesively securing a diaphragm body against only said peripheral portions of said face of the liner member, whereby to permit relative movement between other portions of the liner member and the body for distributing local stresses in the liner member when the diaphragm structure is tightly compressed against a valve seat.

2. The method of making valve diaphragms which is characterized by the steps of: forming a liner member of polytetrafluoroethylene; defluorinating the entire surface of said liner member, which is to be bonded to a body member whereby to activate said surface chemically; assembling said liner member to a vulcanizable, elastomeric body member with said activated surface confronting said member and with a thin layer of weakly adhesive material therebetween; and heating said assembly under perssure to vulcanize said elastomeric body member and chemically bond said liner member thereto with a uniformly low degree of adhesion on the order of no more than two pounds per inch width peel strength, whereby to permit separation of said liner member and said body member at areas stressed during flexing of the valve diaphragm in use.

3. The method of making valve diaphragms which is characterized by the steps of: forming a liner member of polytetrafluoroethylene; defluorinating the surface of said liner member only at regions where little stress is applied to the liner member in use to activate said regions chemically; assembling said liner member to a body member with a layer of adhesive material therebetween only at said regions; and heating said assembly under pressure to bond said liner member to said body member, whereby to permit movement between the liner member and the body member in regions subjected to considerable stress thereby distributing local stresses in the liner member when the diaphragm structure is tightly compressed against a valve seat.

4. The method of making valve diaphragms which is characterized by the steps of: forming a liner member of polytetrafluoroethylene, defluorinating the surface of said liner member only at regions where little stress is applied to said liner member in use to activate said surface regions chemically and to preserve the remainder of said liner member in its normal, poorly adherable state; assembling said liner member to a body member with a layer of strongly adhesive material therebetween at said activated surface regions; and heating said assembly under pressure to bond said liner member to said body member with a high degree of adhesion on the order from 10 to 18 pounds per inch width peel strength, whereby to permit movement between the liner member and the body member in regions subjected to considerable stress thereby distributing local stresses in the liner member when the diaphragm structure is tightly compressed against a valve seat.

5. The method of making valve diaphragms which is characterized by the steps of: forming a liner member of polytetrafluoroethylene; defluorinating the surface of said liner member to activate said surface chemically; removing portions of said chemically active surface only at areas where considerable stress is applied to the liner member in use; assembling said liner member to a body member with a layer of adhesive material between the remaining chemically active surface portions and said body member; and heating said assembly under pressure to bond said liner member to said body member, whereby to permit movement between the liner member and the body member in regions subjected to considerable stress thereby distributing local stresses in the liner member when the diaphragm structure is tightly compressed against a valve seat.

6. The method of making a valve diaphragm which comprises the steps of: forming a liner member of polytetrafluoroethylene; defluorinating at least a peripheral portion of the surface of said liner member to activate said surface portion chemically; placing said liner member in a molding die having groove means opening toward said liner member; assembling a substantially unvulcanized, elastomeric body member to said liner member with a layer of adhesive material between said body member and an activated surface portion of said liner member; and applying heat and pressure to said assembly whereby to bond said liner member to said body member and whereby to mold and vulcanize said body member forming rib means on said body member which back up mating rib and groove means respectively at outer and inner faces of said liner member corresponding to the groove means in said molding die, said liner member providing a mold surface for said elastomeric body member during molding and vulcanizing thereof.

7. The method according to claim 6 wherein said liner member is preformed with said mating rib and groove means.

References Cited by the Examiner

UNITED STATES PATENTS

| | | | |
|---|---|---|---|
| 2,668,789 | 2/54 | Phreaner | 156—309 |
| 2,789,063 | 4/57 | Purvis et al. | |
| 2,871,144 | 1/59 | Doban. | |
| 2,879,252 | 3/59 | Been et al. | |
| 2,947,325 | 8/60 | McFarland. | |

EARL M. BERGERT, *Primary Examiner.*